Patented Mar. 27, 1928.

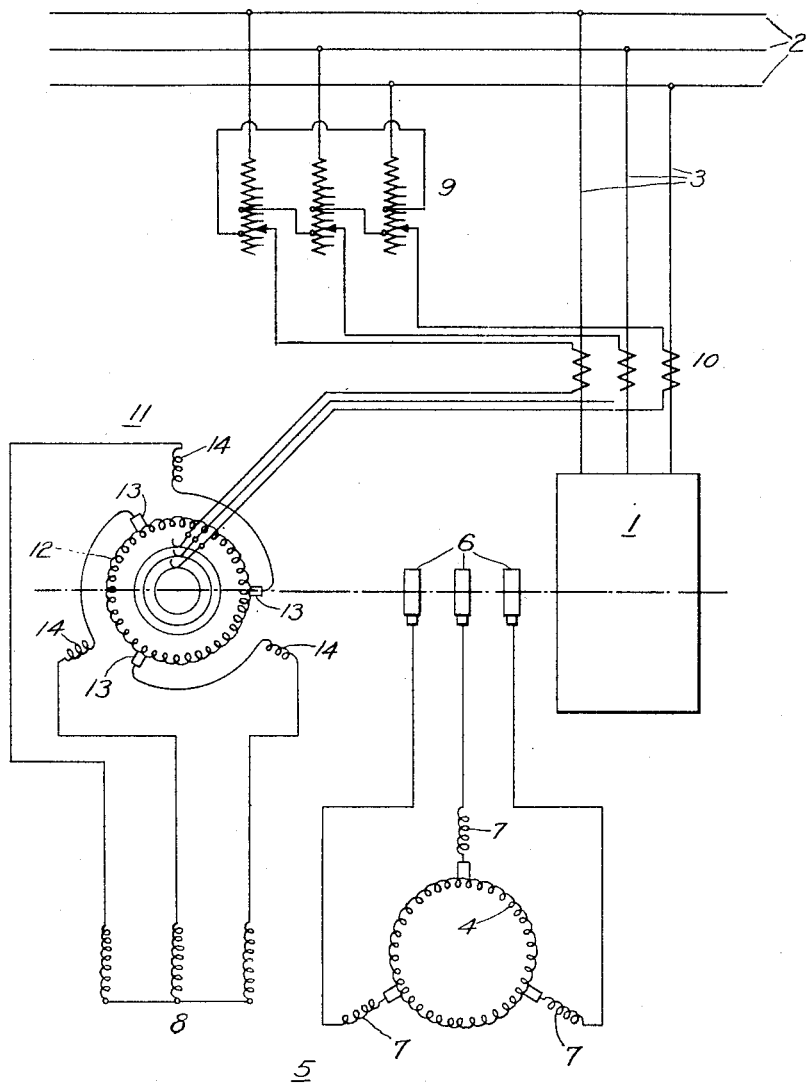

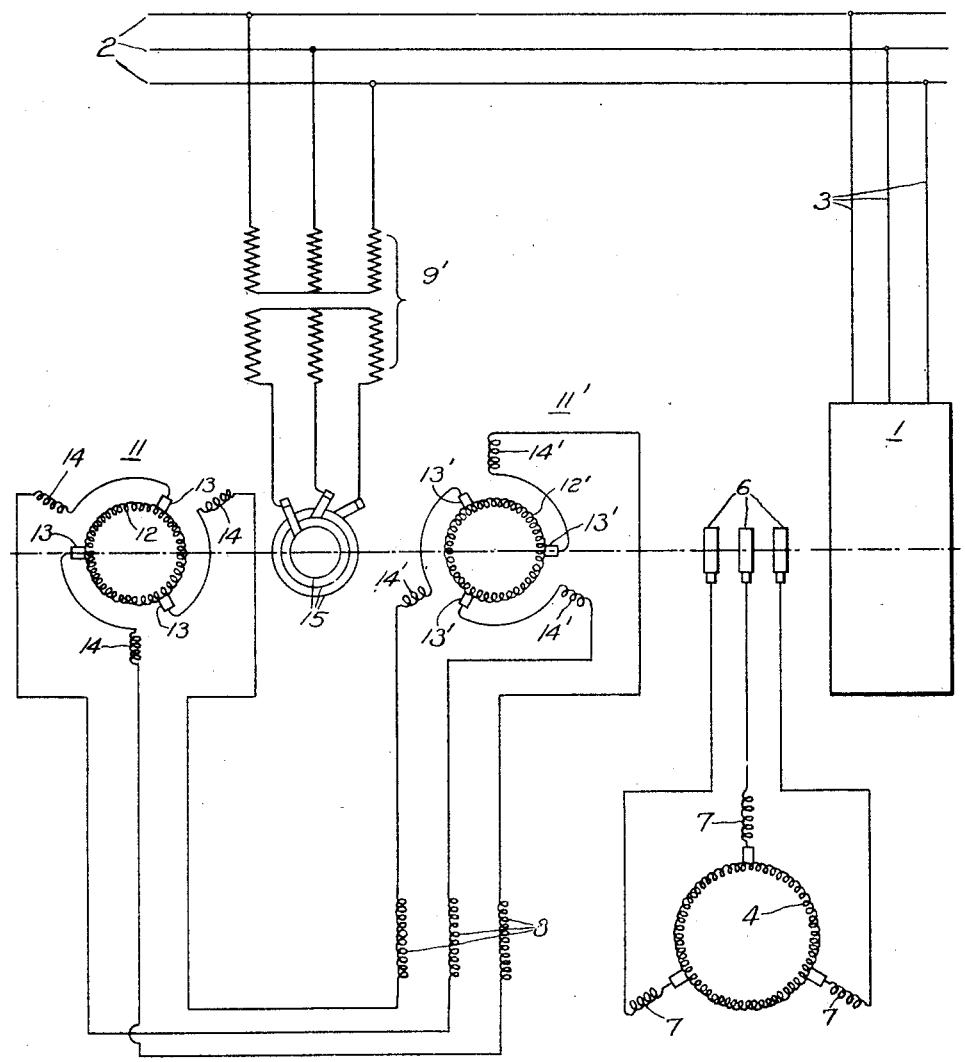

1,664,134

UNITED STATES PATENT OFFICE.

LUCIEN SCHOMBOURGER AND HIDDÉ K. SCHRAGE, OF PARIS, FRANCE, ASSIGNORS TO GENERAL ELECTRIC COMPANY, A CORPORATION OF NEW YORK.

SPEED-CONTROL SYSTEM.

Application filed May 6, 1925, Serial No. 28,474, and in France July 1, 1924.

Our invention relates to systems wherein the speed of an induction motor is controlled by variation in the magnitude of a regulating voltage applied to its secondary circuit through a regulating machine, and has for its object the provision of an improved arrangement whereby stability of the motor is maintained under different conditions of operation.

In the operation of speed control systems comprising a regulating machine concatenated with an induction motor, difficulty is encountered due to variation in phase relation between the field flux of the regulating machine and the secondary voltage of the motor produced by change in the ohmic and inductive voltage drops of the regulating machine field circuit. In accordance with our invention, this difficulty is avoided by the provision of an exciting machine designed to neutralize the effect of these ohmic and inductive voltage drops under different conditions of operation.

Our invention will be better understood from the following description when considered in connection with the accompanying drawing and its scope will be pointed out in the appended claims.

Referring to the drawing, Fig. 1 shows a speed control system wherein means comprising an exciting machine are provided for controlling the phase of the regulating voltage impressed on the motor secondary circuit; and Fig. 2 shows a modified arrangement for controlling the regulating voltage.

Fig. 1 shows an induction motor 1 which is arranged to be supplied with current from a polyphase line 2 through leads 3 and is arranged to have its secondary circuit connected to the armature circuit 4 of a regulating machine 5 through slip rings 6 and the compensating field windings 7 of the machine 5. The regulating machine 5 is provided with a polyphase field winding 8 connected to the polyphase line 2 through a potential regulating transformer 9, a current transformer 10 having its primary winding connected in the leads 3, and an exciter machine 11 having its rotor mounted on the shaft of the induction motor 1. While the transformer 9 is shown as an auto-transformer having its primary windings connected in star and its secondary windings connected in delta, it will be apparent that it may be replaced by a transformer having conductively independent primary and secondary windings. The exciting machine or frequency changer 11 comprises an armature winding 12 which is connected to the exciting field winding 8 of the regulating machine 5 through brushes 13 and field windings 14.

It will be readily understood that, when the machine 11 has the same number of poles and is operated at the same speed as the induction motor 1, the frequency of the current transmitted between machine 11 and field winding 8 of machine 5 is the same as that of the motor secondary current and that the magnitude of the current thus supplied to the winding 8 may be regulated by adjustment of the transformer 9.

In order to render the current of the winding 8 indepedent of the slip frequency and load of the motor 1, it is necessary that component voltages be produced for neutralizing or balancing its ohmic and inductive drops. The ohmic drop of the winding 8 is of course directly proportional to the magnitude of its exciting current while its inductive drop is proportional to the product of the magnitude and frequency of this current. In accordance with our invenion, the frequency changer 11 is so designed that a voltage equal to the ohmic drop of the winding 8 is produced through the winding 12 while a voltage equal to the inductive drop of the winding 8 is produced through the windings 14. The manner in which these component voltages are produced will be readily understood when it is considered that the flux and voltage of the winding 12 are determined by the adjustment of the transformer 9 which controls the current of the winding 8 and that the voltage produced through the windings 14 is dependent both on the flux of the winding 12 and the rate at which this flux moves through space. With the proper relation thus established between the windings 8, 12 and 14, the current of winding 8 is independent of the motor load and slip frequency and the stability of the system under different conditions of operation is ensured.

With the transformer 9 connected as shown in Fig. 1, unity power factor operation of the motor will be obtained for all speeds at one motor load. At other loads approximate control of the power factor and compounding of the motor speed may be attained by use of the current transformer 10 which modifies the current supplied to the machine 11 in accordance with the motor load.

Fig. 2 shows a speed control system which differs from that previously described in that the regulating machine field winding 8 is connected between the brushes 13 and 13' of two frequency changers 11 and 11' which are similar to the machine 11 of Fig. 1, and are mounted on the shaft of the motor 1, and are arranged to have their armature windings 12 and 12' respectively supplied with current from the polyphase line 2 through a transformer 9' and slip rings 15.

In the operation of the arrangement shown by Fig. 2, the magnitude of the regulating voltage produced through the machine 5 is varied by moving the brushes 13 and 13' through equal angles in opposite directions and the power factor at which current is utilized by the motor 1 is controlled by moving the brushes 13 and 13' through unequal angles in opposite directions. It will be apparent that any suitable means may be provided for adjusting the position of the brushes. As in the case of the arrangement shown by Fig. 1, the excitation of the machine 5 is independent of the motor load and slip frequency.

The embodiments of the invention illustrated and described herein have been selected for the purpose of clearly setting forth the principles involved. It will be apparent, however, that the invention is susceptible of being modified in many ways to meet the different conditions encountered in its use and we therefore aim to cover by the appended claims all the modifications within the true spirit and scope of our invention.

What we claim as new and desire to secure by Letters Patent of the United States, is:

1. The combination of an induction motor, a regulating machine provided with an exciting winding and concatenated with said motor for controlling the speed thereof, an exciter for said exciting winding including series connected armature and field windings for controlling the excitation of the exciting winding of the regulating machine, said exciter armature and field windings being related to cause the production of component voltages whereby the ohmic and inductive drop in said exciting winding are neutralized.

2. The combination of an induction motor, a regulating machine provided with an exciting field winding and concatenated with said motor for controlling the speed thereof, and a pair of exciting machines comprising armature windings connected to opposite ends of said exciting winding through series field windings, said armature and series field windings being so proportioned as to cause the production of component voltages whereby the ohmic and inductive drops of said exciting field winding are neutralized.

3. The combination of an induction motor, a regulating machine provided with an exciting field winding and concatenated with said motor for controlling the speed thereof, a source of current, and a pair of exciting machines comprising armature windings connected to said source through slip rings and to opposite ends of said exciting field winding through adjustable brushes and series field windings, the turns of said armature and series field windings being so related as to cause the production of component voltages whereby the ohmic and inductive drops of said exciting field winding are neutralized.

In witness whereof, we have hereunto set our hands this 9th day of April, 1925.

LUCIEN SCHOMBOURGER.
HIDDE K. SCHRAGE.